(12) United States Patent
Embid Droz et al.

(10) Patent No.: US 11,163,751 B2
(45) Date of Patent: Nov. 2, 2021

(54) RESOURCE EXPLOITATION MANAGEMENT SYSTEM, METHOD AND PROGRAM PRODUCT

(71) Applicants: REPSOL, S.A., Madrid (ES); International Business Machines Corporation, Armonk, NY (US)

(72) Inventors: Sonia Mariette Embid Droz, Madrid (ES); Cristina Ibanez-Llano, Madrid (ES); Giorgio De Paola, Madrid (ES); Ruben Rodriguez Torrado, Madrid (ES); Akiko Suzuki, Tokyo (JP); Mustafa Canim, Ossining, NY (US); Yuan-Chi Chang, Armonk, NY (US); Robert Farrell, Cornwall, NY (US); Sharon M. Trewin, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 16/250,581

(22) Filed: Jan. 17, 2019

(65) Prior Publication Data
US 2020/0233851 A1 Jul. 23, 2020

(51) Int. Cl.
*G06F 16/2455* (2019.01)
*G06F 7/14* (2006.01)
(Continued)

(52) U.S. Cl.
CPC ........... *G06F 16/2365* (2019.01); *G06F 7/14* (2013.01); *G06F 16/2455* (2019.01); *G06F 16/24578* (2019.01)

(58) Field of Classification Search
CPC .......... G06F 9/50; G06F 9/3891; G06F 16/27; G06F 16/182; G06F 16/23;
(Continued)

(56) References Cited

U.S. PATENT DOCUMENTS

2012/0232865 A1* 9/2012 Maucec ............... G06F 17/18
703/2
2014/0136462 A1* 5/2014 Hegazy .................. G06N 5/02
706/46

(Continued)

OTHER PUBLICATIONS

Li, et al. Resolving conflicts in heterogeneous data by truth discovery and source reliability estimation. Proceedings of the ACM SIGMOD, 2014.

(Continued)

*Primary Examiner* — Robert W Beausoliel, Jr.
*Assistant Examiner* — Pedro J Santos
(74) *Attorney, Agent, or Firm* — Charles W. Peterson, Jr.; Randy E. Tejeda (57) ABSTRACT

A resource exploitation management system, method and a computer program product therefor. A description of new geological evidence for a geological resource is received, e.g., as one or more triples describing the evidence. Keywords in the description are matched against keywords in representations in a geological resource database. Geological relations are inferred from the descriptions and matched against predefined geological relations from the geological resource database. Consistent triple matches are merged with the geological resource database. The confidence level for merged matches is updated in the geological resource database.

13 Claims, 5 Drawing Sheets

(51) Int. Cl.
*G06F 16/23* (2019.01)
*G06F 16/2457* (2019.01)

(58) Field of Classification Search
CPC ............. G06F 16/2365; G06F 16/2379; G06F 16/285; G06F 16/29
USPC ........................................................ 707/690
See application file for complete search history.

(56) References Cited

U.S. PATENT DOCUMENTS

| | | | |
|---|---|---|---|
| 2015/0332157 A1* | 11/2015 | Baughman | G06N 20/00 706/52 |
| 2017/0046425 A1* | 2/2017 | Tonkin | G06F 40/247 |
| 2017/0060913 A1* | 3/2017 | Kjeilen-Eilertsen | G06N 5/00 |

OTHER PUBLICATIONS

Bhattacharjya, et al., Collective Entity Resolution in Relational Data, ACM Trans. Knowledge Discovery, 2007.

Nuray-Turan et al., Adaptive Connection Strength Models for Relationship-Based Entity Resolution. J. Data and Information Quality, Mar. 2013.

Whang et al. Joint entity resolution on multiple datasets. The VLDB Journal 22, 6 (Dec. 2013), 773-795, 2013.

* cited by examiner

RESOURCE EXPLOITATION MANAGEMENT SYSTEM, METHOD AND PROGRAM PRODUCT

BACKGROUND OF THE INVENTION

Field of the Invention

The present invention is related to valuating hydrocarbon reservoirs and more particularly to automatically consolidating geological information and knowledge, extracted from natural language text and used for valuating hydrocarbon reservoirs.

Background Description

Each new hydrocarbon reservoir has an inherent total value that is based on reservoir properties. The inherent value depends on the total amount of material that is ultimately recoverable from the reservoir (production potential) offset by the cost of recovering the material or capture difficulty. One or more experts estimate that value by identifying and selecting existing reservoirs based on geological knowledge from existing reservoirs. Using that knowledge, often from multiple information sources, including from unstructured document corpus for example, the experts identify those existing reservoirs (known as "analogous reservoirs") with certain aspects similar to the new reservoir.

However, especially when extracting information from multiple geological knowledge sources, the nature of extraction produces results that vary in degree of trust, confidence and accuracy. Further, consolidating the evidence extracted from both unstructured and structured data sources using imperfect information extraction analytics provides fundamental challenges. Moreover, the petroleum geology domain is subject to constant discovery both physically and technologically. New sensor technologies make data collection more common and more precise. Simulations techniques better model the underground geological structure. Each discovery may introduce new evidence to the current corpus and improve understanding of the structure of a new or existing reservoir.

State of the art, knowledge extraction techniques are lossy, and applied to the raw data frequently provide conflicting results and/or contradicting statements. For example, descriptive sentences may contain co-references between nouns and pronouns that may not always resolve correctly in a straightforward way. Some sources may include point-in-time or out of date domain understandings. Also, conflicts may result from disagreement among knowledge corpus and data source creators or between experts. These conflicts may arise, especially with regard to previously unexplored geological regions where validated data is scarce. These conflicts force the reliance on experienced geologists for resolution. Moreover, each introduction may rewrite the previous version of a resource description. Even without a new discovery, if the current knowledge were completely accurate, adding new information to domain knowledge advances knowledge evolution naturally that may introduce inconsistent and/or incomplete knowledge assertions over time. Also, even without contradicting evidence experts may make different assumptions that leads to different conflicting conclusions, that results in inaccurate attribute and property associations. These variations and inaccuracies can cause selecting the wrong reservoir for a mis-valuation and wasted resources, e.g., from passing on an undervalued reservoir to exploit an overvalued reservoir.

Thus, there is a need for accurately consolidating evidence from multiple sources; and, more particularly for resolving conflicts in data collected for new resources.

SUMMARY OF THE INVENTION

A feature of the invention is reduced reliance on experienced geologists for resolving conflicts in geological descriptions;

Another feature of the invention is automatic detection of inconsistencies and contradictions in geological contexts;

Yet another feature of the invention is automatic detection of inconsistencies and contradictions in geological contexts, and automatic generation of the level of confidence for consistent matches for reduced reliance on experienced geologists for resolving conflicts in geological descriptions.

The present invention relates to a resource exploitation management system, method and a computer program product therefor. A description of new geological evidence for a geological resource is received, e.g., as one or more triples describing the evidence. Keywords in the description are matched against keywords in representations in a geological resource database. Geological relations are inferred from the descriptions and matched against predefined geological relations from the geological resource database. Consistent triple matches are merged with the geological resource database. The confidence level for merged matches is updated in the geological resource database.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
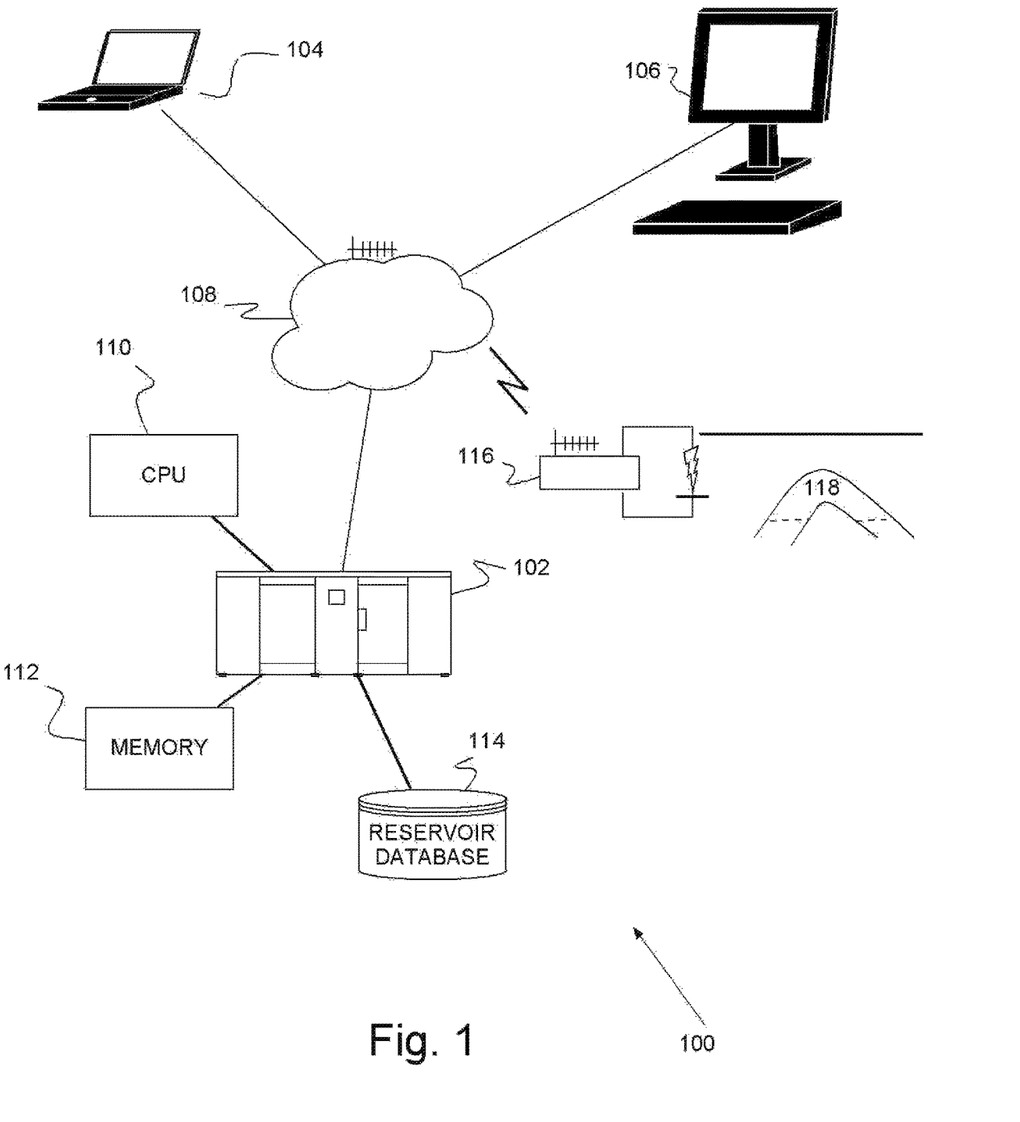
FIG. 1 shows an example of a system for exploiting geological resources (e.g., hydrocarbon reservoirs) with newly received geological evidence, according to a preferred embodiment of the present invention.

Turning now to the drawings and more particularly, FIG. 1 shows an example of a system 100 for exploiting geological resources (e.g., hydrocarbon reservoirs) with newly received geological evidence, according to a preferred embodiment of the present invention. The system 100 includes computers 102, 104 (2 in this example) providing a descriptive matching unit, geological relations inference matching unit and an aggregator, and a connected display 106 for manually matching, accepting and verifying results. The computers 102, 104 and connected display 106 are coupled, wired or wirelessly to, and communicate with each other over, network 108, e.g., a local area network (LAN), the Internet, an intranet or a combination or hybrid thereof. Typically, the computers 102, 104 include one or more processors, e.g., central processing unit (CPU) 110 and memory 112. The preferred system also includes a geological resource database 114, e.g., a reservoir characterization database, with facts describing geological resources. One or more of the computers 102, 104 may be in communication with sensors 116 located at a geological site 118 being monitored.

With a new description or an updated description of a reservoir to computers 102, 104, the preferred system 100 identifies and displays 106 conflicting geological facts from the descriptions in geological resource database 114. Preferably, the facts are maintained as an n-ary relation such as (subject, predicate, object, location, time). These relationships can be refactored into a group of triples (subjects, predicates and objects). The refactored triples are expressed as related phrases or keywords that provide for a visual or graphic representation on display 106. Thus, although described herein with regard to using keywords, it is intended that reference to "keywords" may also refer to phrases interchangeably without departing from the invention.

Whenever the preferred system 100 identifies or infers that two or more geological knowledge triples are inconsistent, the system 100 displays 106 all inconsistencies for resolution by human subject matter experts. The experts can review the inconsistent triples and recommend choices for resolution. Optionally, the preferred system 100 can infer results that are more likely to be correct. By matching agreements and confidence levels from pre-established geological, geographical, and temporal hierarchy, e.g., from geological resource database 114. The inferred results facilitate resolution, highlighting any of those results that are more likely to be correct.

So, for example, triples may indicate that Hue Shale was formed during Cretaceous, Triassic and Oligocene periods. Applying text extraction algorithms to the reported knowledge triple(s), the system 100 may infer that Hue Shale was formed during Cretaceous period, and highlight this on the display 106. An expert reviewing the displayed results, may approve the highlighted selection as correct or reject it. Alternatively, the expert may select a different knowledge triple, declaring selected triple as the correct result. Either way, the preferred system 100 records the result in the geological resource database 114, and removes or discards all incorrect triples.

Figure 2:
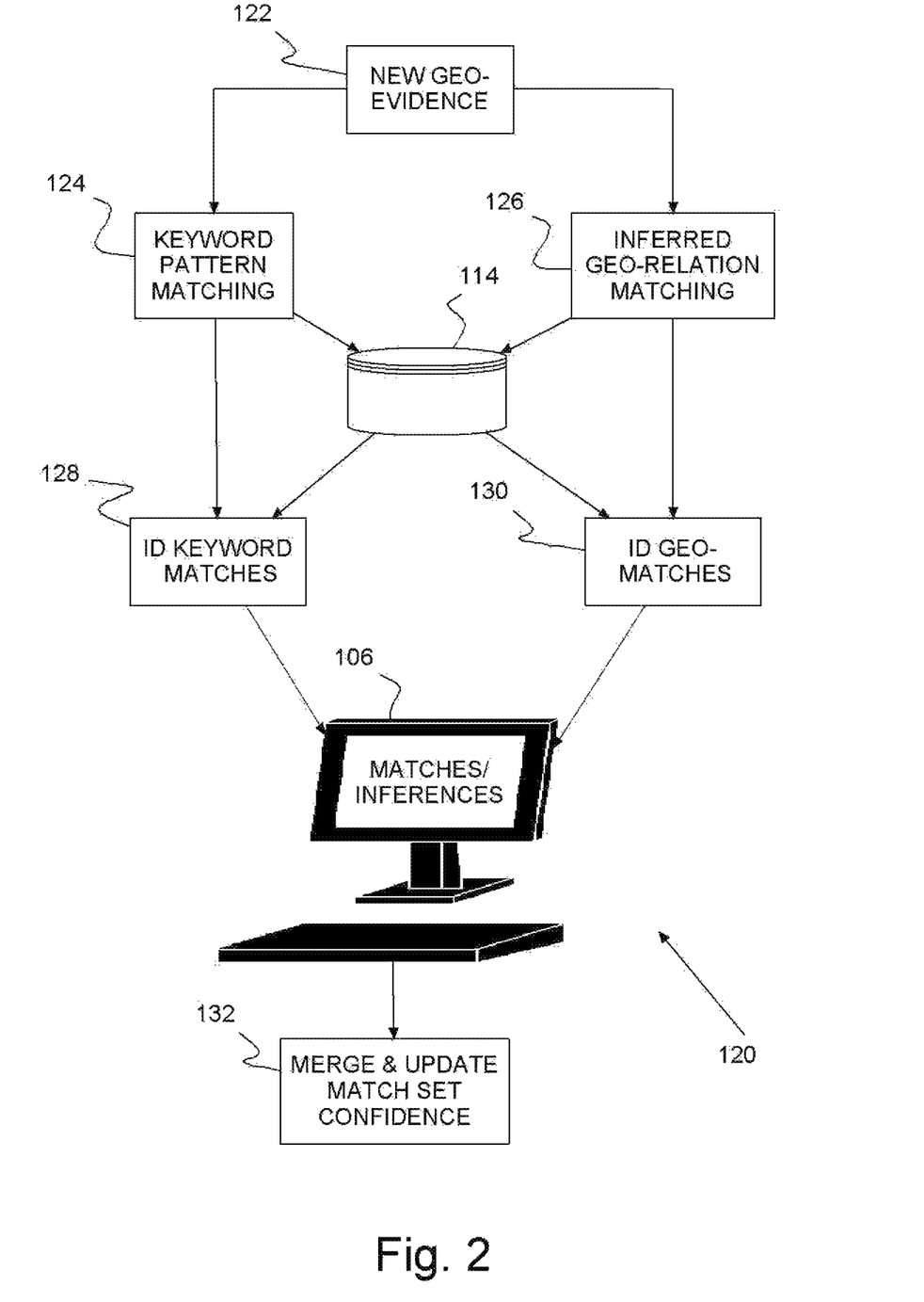
FIG. 2 shows an example of updating geological resource descriptions with newly received geological evidence.

FIG. 2 shows an example 120 of updating geological resource descriptions with newly received 122 geological evidence in the preferred system 100 of FIG. 1 with like features labeled identically. The system 100 compares the new geological evidence, preferably in the form of triples, against existing geological resource descriptions in a geological resource database 114, as well as existing sources of the descriptions. Those existing sources may include, for example, published geological survey reports, maps, geological event charts, and geological formation diagrams. The descriptive matching unit identifies keyword patterns 124 and the geological relations inference matching unit identifies or infers geological relations 126. Keyword pattern matching 124 and geological relation inference 126 may be done separately or in parallel as shown here.

The system 100 renders the results 124, 126, e.g., on display 106, highlighting any text from the existing sources, e.g., report entries, map locations, event chart periods, or formation layers. Each respective unit finds 128, 130 determines the confidence level of a respective match/inference based on the matched existing descriptions 128 and 130. The matches/inferences are displayed 106 with the respective confidence level for user review, and approval or rejection. The aggregator merges 132 approved matches/inferences into the matched sets in a geological resource database 114.

Upon discovery of a new resource, or upon receipt 122 of new information (e.g., from a discovery or an update) on the resource, the preferred system 100 encodes the information, e.g., as rules that describe basic geological, spatial and temporal knowledge. In particular, the preferred system 100 uses geophysical, lithology, and/or petro-chemical principles to define governing geological relations for coding machine interpretable rules. The petro-chemistry industry and academic publications have existing standard that are universally and consistently used definitions, and defined for petroleum geology. For petro-chemical analysis the preferred system 100 maps these pre-defined nomenclature sets to physical properties of rock types, organic content. Using this industry-wide and academic agreement, the present invention provides for comparing and contrasting geological evidence from multiple sources.

A typical field description or rule(s) in a hydrocarbon database may include several different types of field attribute descriptors that are related to the field by several different types of relational characteristics. The attribute types may include, for example, geographical, time or temporal, geological, petroleum system, rock, hydrocarbon and other (everything else). Relational types may indicate, for example, that the field: contains, overlies, had a depositional environment, formed during, composed of, located at, has the property of, is associated with, and/or has many of, the particular features.

Preferably, from the rules the system 100 represents the resource information in the form of triples. Preferably also, each triple represents two entities or nodes and the relation between the two. For example, a triple may indicate that a geological/rock formation (entity) formed (relation) during a specific temporal interval (associated geological time). The preferred system 100 focuses on petroleum geology to apply background knowledge for improving knowledge extraction from new geological evidence 122.

The system 100 may collect new geological evidence 122 automatically, e.g., using a searchbot or from physical data as it is collected. A searchbot automatically collect new geological evidence 122 online from geological survey publications, conference proceedings, meeting minutes, and proprietary databases, as well. Many petroleum exploration groups maintain and curate free publications and proceedings. Petroleum databases typically have curated structures. Suitable knowledge extraction tools for extracting keywords and phrases include, for example, IBM Watson Knowledge Studio. Physical data collection may be, for example, from location sensors 116, or as provided by personnel checking or monitoring the site 118.

After or during collection, the system 100 represents the new geological evidence 122, preferably, as one or more triples, or in another suitable knowledge format, e.g., W3C Web Ontology Language. Preferably, the triples also include an associated confidence level indication, when available.

Established geological facts exist regarding source rock. For example, Middle Devonian to lower Mississippian epochs are known for widespread marine anoxic oil and gas source beds that are located Mid-Continent (North America) and in Appalachia. Also, upper Jurassic marine mudstone or its stratigraphic equivalents, known as Kimmeridge Clay, generated most of the oil found in the North Sea and the Norwegian Sea. The late Cretaceous Turonian formation, known as La Luna Shale, generated most of the oil in Venezuela. The Marcellus Formation, for example, overlies the Onondaga Formation, is a unit of the Hamilton Group, and formed during the Early Pennsylvanian sub-period. Expressing this as triples: Marcellus Formation, overlies, Onondaga Formation; Marcellus Formation, Unit of, Hamilton Group; and Marcellus Formation, Formed during, Early Pennsylvanian.

A logical inference (or inferred fact) of the above facts, for example, is that the Marcellus Formation (entity) is located (relation) at the Appalachian Basin (geolocation). It is also known that source rock in the Appalachian Basin formed during the Middle Devonian to Lower Mississippian sub-periods. A logical inference of this is that Marcellus Formation formed during the Middle Devonian to Lower Mississippian sub-periods. However, these two logical inferences contradict each other, creating a detectable inconsistency, automatically identified by the preferred system 100.

Figure 3A:
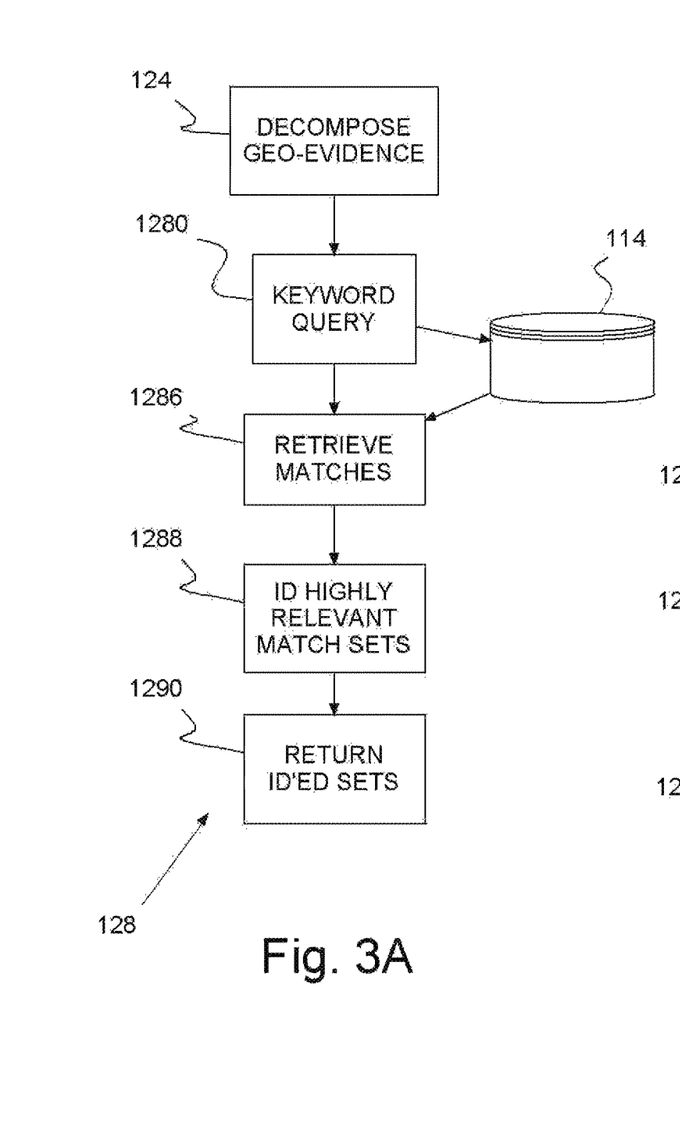
FIGS. 3A-B show an example of using keyword pattern matching for identifying relevant knowledge triples for new geological evidence.
Figure 3B:
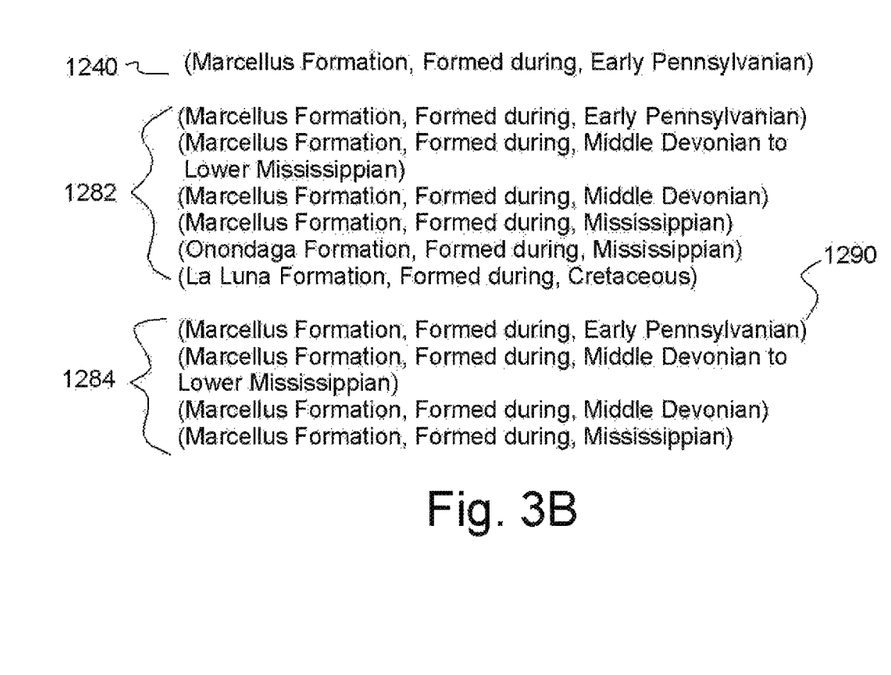

FIGS. 3A-B show an example of the descriptive matching unit (e.g., in computers 102, 104 in FIG. 1) performing keyword pattern matching 124 to identify relevant knowledge triples 128 from new geological evidence. First, the descriptive matching unit decomposes 124 the new geological evidence into a set of keyword triples 1240 derived from subjects, predicates and objects. Then, the preferred system 100 uses the keyword set from the triples to query 1280 geological resource database entries 1282 for matches 1284. The descriptive matching unit retrieves 1286 matched triples 1284, identifies 1288 any highly relevant sets 1290, e.g., using triple and/or graph similarity matching. Triple matching requires a match of two out three elements. In graph similarity triples linked by subjects or objects match whenever predicate links match above a threshold, e.g., 80%.

For example, a typical new geological triple 1240 may indicate a formation (Marcellus Formation), a relationship term (Formed during) and a corresponding time period (Early Pennsylvanian). In this example, the geological resource database entries 1282 include six (6) triples. The database entries 1282 triples indicate three (3) formations (Marcellus Formation, Onondaga Formation and La Luna Formation), a common relationship term (Formed during) and five (5) corresponding time periods (Early Pennsylvanian, Middle Devonian to Lower Mississippian, Middle Devonian, Mississippian and Cretaceous).

Preferably, the descriptive matching unit uses an n-gram match, for example, to find matches 1284 in the geological resource database entries 1282. An n-gram is a contiguous sequence of n items from a given sequence of text or speech. Thus, the keyword query 1280 identifies matches 1284 with a common formation (Marcellus Formation) and common relationship term (Formed during), and in four (4) time periods (Early Pennsylvanian, Middle Devonian to Lower Mississippian, Middle Devonian and Mississippian). The descriptive matching unit retrieves 1286 matched triples 1284, identifies 1288 highly relevant sets 1290 (an exact match in this example), and returns 1292 that highly relevant match 1290.

Figures 4A, 4B:
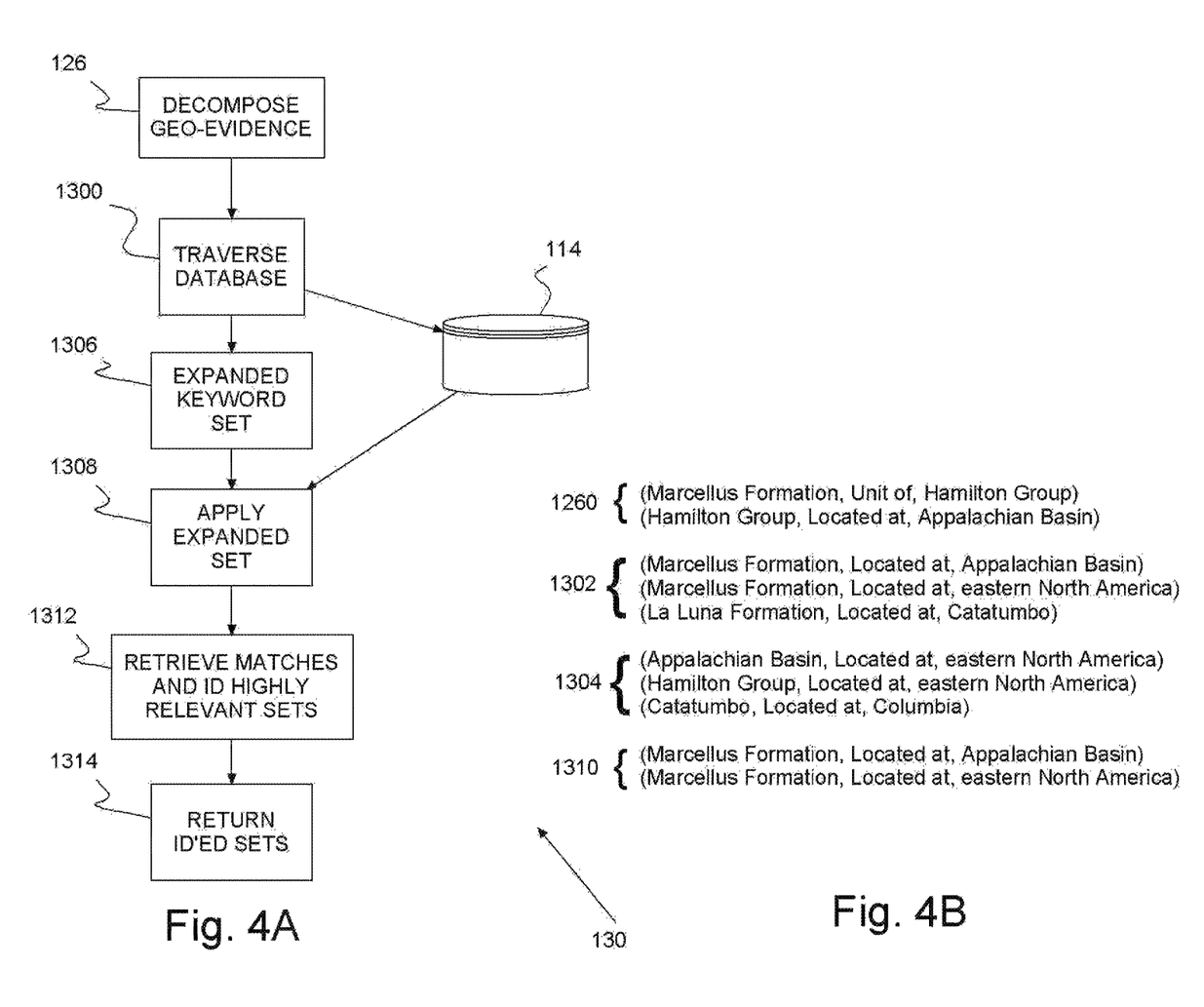
FIGS. 4A-B show an example of identifying relevant knowledge triples for new geological evidence using geological relation inferencing.

FIGS. 4A-B show an example of the geological relation inferencing unit (e.g., in computers 102, 104 in FIG. 1) identifying relevant knowledge triples for new geological evidence using geological relation inferencing 126. The descriptive matching unit decomposes 126 the new triple 1260 derived from geological subjects, predicates and objects as a set of keywords. Then, the inferencing unit traverses 1300 geological resource database entries 1302 for predefined geological relations 1304 with matching predicates, which may result in an expanded set of keywords 1306. The inferencing unit applies 1308 the expanded set to the database entries 1302 to identify matches 1310. The inferencing unit retrieves 1312 matched triples 1312, identifies highly relevant sets, e.g., using triple and/or graph similarity matching, and returns 1314 the highly relevant sets 1312.

In this example, a typical new geological triple 1260 may indicate a formation (Marcellus Formation), a relationship term (Unit of, and Located at) and a corresponding location (Hamilton Group and Appalachian Basin). Also in this example, the geological resource database entries 1302 include three (3) triples. The database triples indicate two (2) formations (Marcellus Formation, and La Luna Formation), a common relationship term (Located at) and three (3) corresponding locations (Appalachian Basin, eastern North America and Catatumbo).

The geological relations 1304 include three (3) formation groups (Appalachian Basin, Hamilton Group, and Catatumbo Marcellus Formation), a common relationship term (Located at), and two (2) locations (eastern North America and Columbia). The preferred system 100 retrieves 1312 matched triples 1310, identifies two (2, both in this example) highly relevant sets with a common formation (Marcellus Formation) and relationship term (Located at), and at two (2) locations (eastern North America and Columbia). The preferred system 100 returns 1314 these 2 highly relevant matches 1310.

Figure 5:
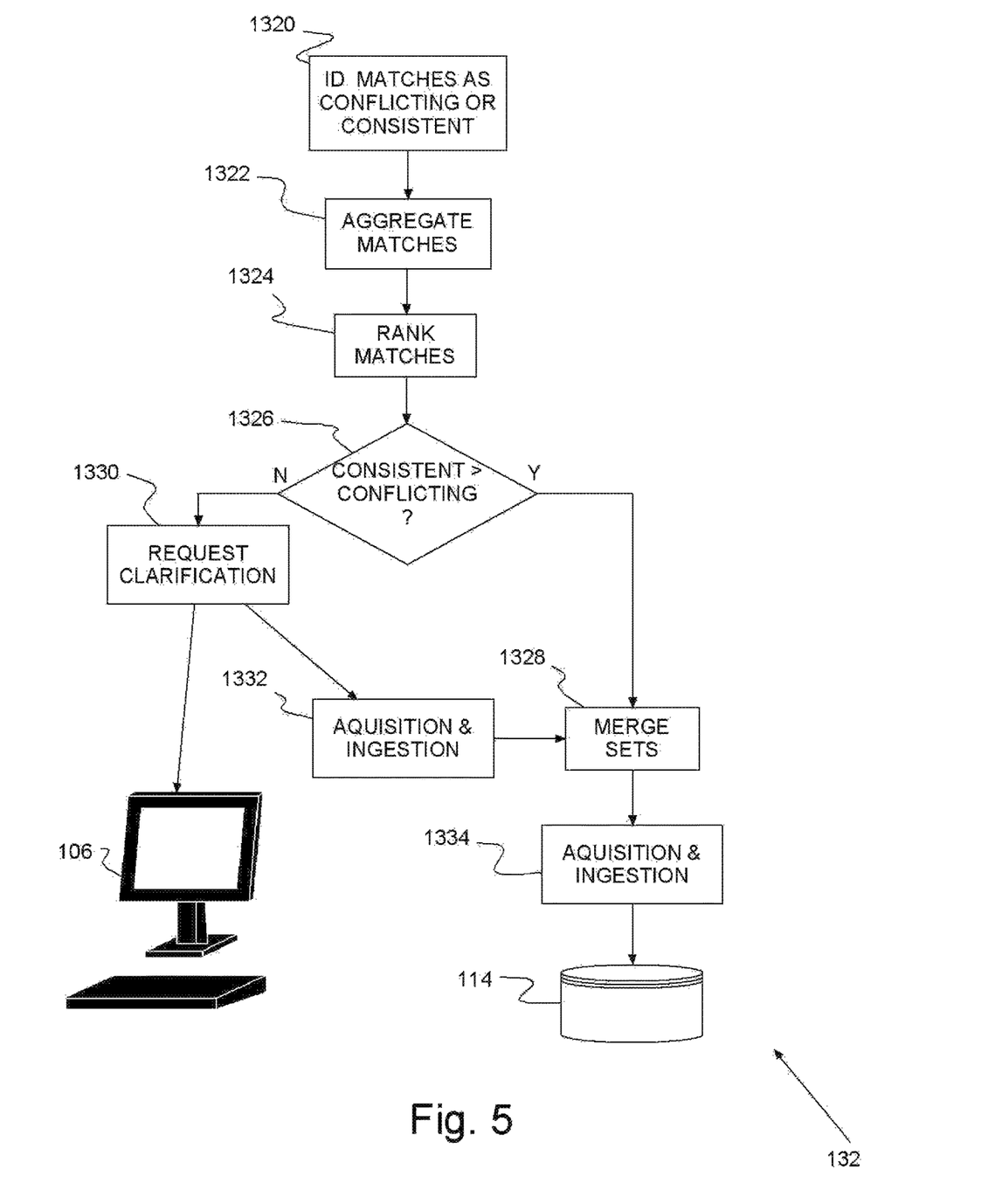
FIG. 5 shows an example of determining and updating triple confidence level or trust of a matching set of knowledge triples.

FIG. 5 shows an example of the aggregator (e.g., in computers 102, 104 in FIG. 1) determining and updating 132 the confidence level or trust of a matching triples or sets of knowledge triples, 1290, 1310 in FIGS. 3A-B and 4A-B. The aggregator may track all mismatches or incorrect matches, and optionally track all correct matches, coupled with corresponding originating information sources. Suitable statistical measures of confidence level include, for example, majority vote, weighted authoritative sources, and machine learned likelihood statistics. Originating information sources may include a combination of unstructured text corpus and knowledge extraction tools applied to the corpus. Tracking history may be maintained in the geological resource database 114.

Using geological, geographical and temporal inferencing rules, the system 100 identifies 1320 consistent and conflicting knowledge triples. Then, the aggregator aggregates 1322 triples, consistent and conflicting, by confidence level using, for example, an average or a majority vote. The aggregates ranks 1324 the aggregated confidence level for consistent triples against the confidence level associated with any conflicts. Thus, for sources used in ranking 1324 the confidence scores may be determined from comparing the number of consistent triples against the number of inconsistent triples. Viewing the scores associated with knowledge sources, e.g., on display 106, an expert can decide whether to include or exclude each result from future knowledge ingestion, and can selectively remove any knowledge triples from excluded sources.

For example, taking into account geological context, the Meeteetse Formation is known to have a thermal maturity (ThermalMaturity) of over mature (overmature) for the current time period, i.e., today. During the Cretaceous period (time period) the Meeteetse Formation is known to have a mature (mature) thermal maturity (ThermalMaturity). These triples are consistent and may be aggregated.

If the aggregated confidence level ranks 1326 greater than the conflicting evidence, then the aggregator merges 1328 new knowledge triple(s) 1290, 1310 with the knowledge database. Otherwise, the match is left open for further interpretation, wherein the system 100 displays 106 the conflict and issues automated request 1330 for clarification. Experts (e.g., geoscientists) may answer the automated request 1330. Alternately, the automated request 1328 may trigger additional corpus acquisition and ingestion 1332. Such, acquisition and ingestion 1332 may focus on the resource area or location for additional evidence to reach a resolution. After merging 1328, the preferred system 100 updates 1334 the confidence level of the matched sets.

Thus advantageously, the preferred system detects inconsistencies and contradictions in geological contexts represented as triples or in a similar knowledge representation. The received representations may be matched by keyword pattern matching or inferred relations defined in geological rules to detect conflicts, e.g., from inconsistencies. Consistent representations may be appended and merged with existing representations triples in a knowledge database or knowledge store. Consistent and inconsistent representations may be maintained in the store serving as aggregation point of the geological findings. The merged set is updated with a new confidence score determined using a suitable confidence measure. The confidence score provides a system generated confidence measure about stored knowledge on the area.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of exploiting geological resources, said method comprising:
   receiving a description of new geological evidence for a geological resource, wherein the geological resource is a hydrocarbon reservoir;
   matching keywords in said description against keywords in representations in a geological resource database;
   inferring geological relations from said descriptions, wherein the resource descriptions are inferred from petro-chemical analysis mapping pre-defined nomenclature sets to physical properties of rock types and organic content;
   matching said inferred geological relations against pre-defined geological relations from said geological resource database;
   merging consistent matches with said geological resource database;
   updating confidence level in said geological resource database for merged matches; and
   estimating a value for the geological resource by identifying and selecting existing resources based on updated confidence levels for the geological resource database.

2. A method as in claim 1, wherein said description comprises one or more triples describing said new geological evidence.

3. A method as in claim 2, wherein matching keywords comprises:
   decomposing said one or more triples into a plurality of geological formation keywords;
   querying said geological resource database with said plurality of geological formation keywords for triples with keyword matches;
   retrieving said triples with keyword matches from said geological resource database;
   identifying highly relevant said retrieved triples; and
   returning identified highly relevant geological formation triples as keyword matches.

4. A method as in claim 3, wherein said plurality of geological formation keywords are decomposed from geological resource subjects, predicates and objects, and highly relevant triples are determined by graph similarity matching to identify highly relevant sets.

5. A method as in claim 2, wherein inferring geological relations comprises:
   decomposing said one or more triples into a plurality of geological geographically related keywords;
   querying said geological resource database with said plurality of geological geographically related keywords for matching geographical relationships;
   selectively expanding said plurality of geological geographically related keywords responsive to query matches;
   matching the geological geographically related keywords with triple in the geological resource database entries;
   retrieving matching said triples from said geological resource database;
   identifying highly relevant said retrieved triples; and
   returning identified highly relevant triples as geologically inferred matches.

6. A method as in claim 5, wherein said plurality of geological geographically related keywords are decomposed from geological geographically relation subjects, predicates and objects, and highly relevant triples are determined by graph similarity matching to identify highly relevant sets.

7. A method as in claim 2, wherein merging consistent matches comprises:
   identifying said keyword matches and said inferred geological relations matches as consistent and conflicting;
   aggregating consistent and conflicting matches;
   identifying as consistent matches any triples with aggregated consistent matches exceeding conflicting matches; and
   merging identified said with matched said geological resource database entries.

8. A method as in claim 7, wherein whenever the aggregated consistent matches do not exceed conflicting matches, merging consistent matches further comprises displaying a clarification request.

9. A method as in claim 7, wherein whenever the aggregated consistent matches do not exceeding conflicting match, merging consistent matches further comprises triggering additional corpus acquisition and ingestion focused on resource area or location.

10. A computer program product for exploiting geological resources, said computer program product comprising a non-transitory computer usable medium having computer readable program code stored thereon, said computer readable program code causing one or more computers executing said code to:
    receive a description of new geological evidence for a geological resource, said description comprising one or more triples describing said new geological evidence, wherein the geological resource is a hydrocarbon reservoir;
    match keywords in said description against keywords in representations in a geological resource database;
    infer geological relations from said descriptions, wherein the resource descriptions are inferred from petro-chemical analysis mapping pre-defined nomenclature sets to physical properties of rock types and organic content;
    match said inferred geological relations against pre-defined geological relations from said geological resource database;
    merge consistent matches with said geological resource database;
    update confidence level in said geological resource database for merged matches; and
    estimate a value for the geological resource by identifying and selecting existing resources based on updated confidence levels for the geological resource database.

11. A computer program product for exploiting geological resources as in claim 10, said wherein computer readable program code matching keywords causes said one or more computers executing said code to:
    decompose said one or more triples into a plurality of geological formation keywords;
    query said geological resource database with said plurality of geological formation keywords for triples with keyword matches;
    retrieve said triples with keyword matches from said geological resource database;
    identify highly relevant said retrieved triples; and
    return identified highly relevant geological formation triples as keyword matches.

12. A computer program product for exploiting geological resources as in claim 10, said wherein computer readable program code inferring geological relations causes said one or more computers executing said code to:

decompose said one or more triples into a plurality of geological geographically related keywords;
query said geological resource database with said plurality of geological geographically related keywords for matching geographical relationships;
selectively expand said plurality of geological geographically related keywords responsive to query matches;
match the geological geographically related keywords with triple in the geological resource database entries;
retrieve matching said triples from said geological resource database;
identify highly relevant said retrieved triples; and
return identified highly relevant triples as geologically inferred matches.

13. A computer program product for exploiting geological resources as in claim 10, said wherein computer readable program code merging consistent matches causes said one or more computers executing said code to:
identify said keyword matches and said inferred geological relations matches as consistent and conflicting;
aggregate consistent and conflicting matches;
identify as consistent matches any triples with aggregated consistent matches exceeding conflicting matches; and
merge identified said with matched said geological resource database entries; and whenever the aggregated consistent matches do not exceed conflicting matches display a clarification request.

* * * * *